Aug. 15, 1933.   K. GUNDLACH   1,922,434
METHOD OF INDEXING GLASS PHOTOMECHANICALLY
Filed March 5, 1932

Inventor:
Karl Gundlach

Patented Aug. 15, 1933

1,922,434

UNITED STATES PATENT OFFICE 1,922,434

METHOD OF INDEXING GLASS PHOTOMECHANICALLY

Karl Gundlach, Jena, Germany, assignor to the firm of Carl Zeiss, Jena, Germany

Application March 5, 1932, Serial No. 597,091, and in Germany March 13, 1931

1 Claim. (Cl. 95—5.7)

An application has been filed in Germany, March 13, 1931, of which the following is a specification:

Glass scales are required for many scientific and technical purposes, especially for physical measuring instruments. As a rule, these scales have been provided according to two methods. According to one of these two methods the scale is scratched into the glass direct, generally by means of an indexing machine. With the other of the said two methods the glass is first provided with an acid-proof layer. By means of a suitable tool, for instance a metal tool, lines or figures are scratched into this layer, the lines or figures thus created reaching the glass, and the parts of the glass that have been laid bare in this manner are etched by means of fluorhydric acid. This acid having been effective, the protective layer is removed from the glass by means of a suitable solvent.

Both methods are troublesome and costly when many lines or figures have to be etched into the glass. Also it is difficult to provide in this manner completely equidistant scale divisions, which is due to the exactness of the scales thus provided depending on the uniform working of the indexing machines, which may be disturbed by uncontrollable influences. Further, it is troublesome and costly, if not impossible, to produce according to the aforesaid methods irregular scales or scales of extraordinary form as for instance any curved scales.

These difficulties are overcome by indexing the glass in a photomechanical manner. Photomechanical methods of etching glass have been suggested already; these methods, which are in most cases based on the application of light-sensitive asphalt or of chromate colloid layers, entail however great disadvantages and therefore hardly can be used in practice, the reason being that the light-sensitive layers are either not sensitive enough, as for instance asphalt, or not resistant enough against the influence of fluorhydric acid, as for instance layers of chromate colloid.

Providing even very finely etched divisions in a photomechanic manner according to the invention does not present the slightest difficulty when chromate colloid layers are not applied to the glass direct, as is the case with all photomechanical methods suggested hitherto, but when, before applying the light-sensitive layer, the glass to be etched is provided direct with a layer of metal or metal combinations which, at the outset, is highly resistant against the effect of fluorhydric acid. Only then is the glass provided with a protective layer of this kind coated by means of the light-sensitive layer. In this light-sensitive layer, by applying in the usual manner a negative or a positive glass image, the scale to be etched later-on is produced by exposing to light and subsequently developing it. The colloid layer having been developed and removed from those places which had not been exposed to light, that part of the protective metal layer which is now free from the light-sensitive layer is removed by means of a suitable solvent and those parts of the glass which are now completely free from any layer are exposed to the effect of the fluorhydric acid. Subsequent to the etching, the protective as well as the light-sensitive layers are removed from the other parts of the glass by means of suitable solvents. On the glass only the etched-in scale now remains. This scale is ready for use. If a better visibility is required, the scale divisions may be blackened by known means or treated in any other manner.

A protective layer of metal or metal combinations applied direct offers the advantage that it can be made sufficiently dense and, at the same time, thin and uniform and without any disturbing holes, thus resisting the effect also of the strongest fluorhydric acid even when being very thin. The following metals may be stated as examples for the use as protective layers: platinum, gold, silver or copper. As examples of metal combinations these may be stated sulphides or selenides of lead or antimony.

The method may be applied not only for providing scales for measuring instruments but also in the manufacture of printing plates and diffraction gratings.

The accompanying drawing illustrates an example of the new method. Figures 1 to 5 represent sections, and Figure 6, a view.

In Figure 1, a glass plate $a$ is covered with a layer $b$ of silver which, in its turn, bears a layer $c$ of chromate colloid.

Figure 2 shows the object subsequently to a scale having been photographically provided on the layer $c$ and after the development by means of a solvent, for instance alcohol, of the parts covered by the lines of the scale, that is to say the non-exposed parts of the layer $c$. The layer $c$ now has narrow slits $d$.

In Figure 3, the slits $d$ are worked through the layer $b$ by etching this layer for instance with nitric acid.

In Figure 4, grooves are worked through the slits *d* into the glass plate *a* by means of fluorhydric acid.

Figure 1:
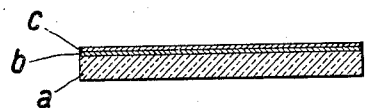
Figure 2:
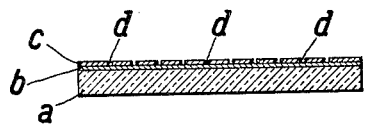
Figure 3:
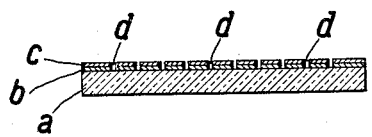
Figure 4:
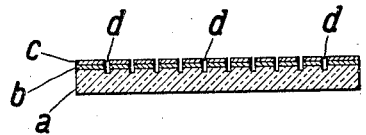
Figure 5:
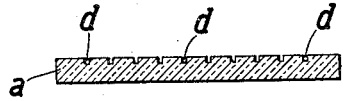
Figure 5 shows the glass plate *a* subsequently to the layers *b* and *c* having been removed by solvents.
Figure 6:
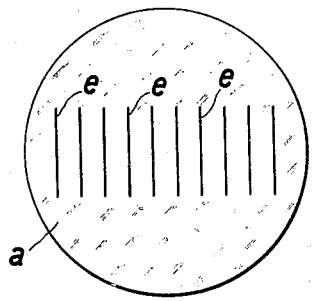
Figure 6 represents a view of the plate *a* bearing the scale. The scale lines *e* are provided with a blackening means.

To afford being represented in the drawing, the thickness of the layer *c*, and especially that of the layer *b*, as well as the breadth of the slits *d* and the lines *e* are strongly exaggerated.

I claim:

A method of photomechanically producing glass scales and the like, which consists in providing a glass body direct with a layer protecting against fluorhydric acid, this protective layer being of metal or metal combinations, in covering this protective layer with a light-sensitive layer, in photographically transmitting the scale to be produced onto the light-sensitive layer, in developing the light-sensitive layer, in removing the protective layer from those places which have not been exposed to light, in etching the glass at the said places, and, finally, in removing the light-sensitive layer and the protective layer on the other parts of the glass.

KARL GUNDLACH.